US011347508B2

(12) United States Patent
Barnes

(10) Patent No.: US 11,347,508 B2
(45) Date of Patent: May 31, 2022

(54) APPARATUS AND METHOD FOR MANAGING A CAPABILITY DOMAIN

(71) Applicant: ARM LIMITED, Cambridge (GB)

(72) Inventor: Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/607,462

(22) PCT Filed: Apr. 27, 2018

(86) PCT No.: PCT/GB2018/051114
§ 371 (c)(1),
(2) Date: Oct. 23, 2019

(87) PCT Pub. No.: WO2018/215733
PCT Pub. Date: Nov. 29, 2018

(65) Prior Publication Data
US 2020/0050454 A1 Feb. 13, 2020

(30) Foreign Application Priority Data
May 25, 2017 (GB) ...................................... 1708395

(51) Int. Cl.
*G06F 9/30* (2018.01)
*G06F 9/32* (2018.01)
(52) U.S. Cl.
CPC .......... *G06F 9/30058* (2013.01); *G06F 9/321* (2013.01)
(58) Field of Classification Search
CPC .................................................. G06F 9/30058
See application file for complete search history.

(56) References Cited

U.S. PATENT DOCUMENTS 5,845,331 A 12/1998 Carter et al.
8,850,573 B1 9/2014 Chen et al.
(Continued)

FOREIGN PATENT DOCUMENTS

EP 2 669 807 12/2013
GB 2541714 3/2017
(Continued)

OTHER PUBLICATIONS

International Search Report and Written Opinion of the ISA for PCT/GB2018/051114, dated Jul. 2, 2018, 19 pages.
(Continued)

*Primary Examiner* — Michael J Metzger
(74) *Attorney, Agent, or Firm* — Nixon & Vanderhye P.C.

(57) ABSTRACT

An apparatus and method are provided for managing a capability domain. The apparatus has processing circuitry for executing instructions, the processing circuitry when in a default state being arranged to operate in a capability domain comprising capabilities used to constrain operations performed by the processing circuitry when executing the instructions. A program counter capability storage element is also provided to store a program counter capability used by the processing circuitry to determine a program counter value. The program counter capability is arranged to identify a capability state for the processing circuitry. The processing circuitry is then arranged, when the capability state indicates the default state, to operate in the capability domain. However, when the capability state indicates the executive state, the processing circuitry is arranged to operate in a manner less constrained than when in the default state so as to allow modification of the capability domain. This provides a simple and effective mechanism for selectively allowing the apparatus to modify the capability domain.

19 Claims, 9 Drawing Sheets

(56) References Cited

U.S. PATENT DOCUMENTS

| | | | |
|---|---|---|---|
| 9,116,711 B2 | 8/2015 | Grocutt | |
| 2004/0105298 A1 | 6/2004 | Symes | |
| 2008/0250217 A1 | 10/2008 | Kershaw et al. | |
| 2011/0167242 A1 | 7/2011 | De Jong et al. | |
| 2013/0326193 A1* | 12/2013 | McCarthy | G06F 9/321 712/207 |
| 2015/0006855 A1* | 1/2015 | Gschwind | G06F 9/3806 712/207 |
| 2018/0203697 A1* | 7/2018 | Greiner | G06F 9/467 |
| 2018/0225120 A1* | 8/2018 | Barnes | G06F 9/30054 |

FOREIGN PATENT DOCUMENTS

| | | |
|---|---|---|
| GB | 2544996 | 6/2017 |
| TW | 201716995 | 5/2017 |
| WO | 2017/032969 | 3/2017 |

OTHER PUBLICATIONS

Combined Search and Examination Report for GB 1708395.7, dated Oct. 30, 2017, 6 pages.
Office Action for EP Application No. 18722167.6 dated Aug. 19, 2021, 6 pages.
Office Action for TW Application No. 107115539 dated Nov. 17, 2021 and English translation, 22 pages.
Office Action for JP Application No. 2019-563509 dated Feb. 17, 2022 and English translation, 7 pages.
Office Action for IN Application No. 201947049445 dated Feb. 25, 2022, 8 pages.

* cited by examiner

A) SET PR1 = 140000 ⟶ trigger error

B) SET PR1 = 140000

LD R5, PR1 ⟶ trigger error

APPARATUS AND METHOD FOR MANAGING A CAPABILITY DOMAIN

This application is the U.S. national phase of International Application No. PCT/GB2018/051114 filed 27 Apr. 2018, which designated the U.S. and claims priority to GB Patent Application No. 1708395.7 filed 25 May 2017, the entire contents of each of which are hereby incorporated by reference.

The present technique relates to the field of data processing.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

A number of capability storage elements (for example registers) may be provided for storing capabilities such as bounded pointers for access by the processing circuitry of a data processing apparatus. Each bounded pointer within such a capability storage element will identify a non-extendible range of memory addresses accessible by the processing circuitry, and hence each bounded pointer may be referred to as a capability (identifying an allowable range of memory addresses that the processing circuitry is capable of accessing, along with any associated permissions). Whilst the processing circuitry may be allowed to take steps to reduce the range and/or permissions associated with any particular bounded pointer available to it, it cannot in normal operation extend the range in order to seek to increase the capability afforded to the processing circuitry by that bounded pointer.

Any particular range of memory addresses identified by a bounded pointer within a capability storage element may contain data, instructions and/or other capabilities (e.g. other bounded pointers). Hence, it will be appreciated that at any point in time the processing circuitry's ability to access memory is defined by a set of capabilities comprising the capabilities identified in the capability storage elements and any further capabilities accessible via the capabilities held in those capability storage elements, and this set of capabilities will be referred to herein as a capability domain.

There may be a need during operation of the data processing apparatus to seek to alter the capability domain of the processing circuitry. However, this may require access to memory addresses that are not accessible given the capabilities of the current capability domain.

It would be desirable to provide an efficient and reliable mechanism for enabling such a change in the capability domain of the processing circuitry.

In a first example configuration, there is provided an apparatus comprising: processing circuitry to execute instructions, the processing circuitry when in a default state being arranged to operate in a capability domain comprising capabilities used to constrain operations performed by the processing circuitry when executing said instructions; and a program counter capability storage element to store a program counter capability used by the processing circuitry to determine a program counter value, the program counter capability identifying a capability state for the processing circuitry; the processing circuitry being arranged, responsive to the capability state indicating said default state, to operate in the capability domain; and the processing circuitry being arranged, responsive to the capability state indicating an executive state, to operate in a manner less constrained than when in said default state so as to allow modification of the capability domain.

In another example configuration, there is provided a method of managing a capability domain within an apparatus having processing circuitry to execute instructions, the processing circuitry when in a default state being arranged to operate in the capability domain, the capability domain comprising capabilities used to constrain operations performed by the processing circuitry when executing said instructions, comprising: storing, within a program counter capability storage element, a program counter capability used by the processing circuitry to determine a program counter value, the program counter capability identifying a capability state for the processing circuitry; responsive to the capability state indicating said default state, operating the processing circuitry in the capability domain; and responsive to the capability state indicating an executive state, operating the processing circuitry in a manner less constrained than when in said default state so as to allow modification of the capability domain.

In a yet further example configuration, there is provided an apparatus comprising: processing means for executing instructions, the processing means, when in a default state, for operating in a capability domain comprising capabilities used to constrain operations performed by the processing means when executing said instructions; and program counter capability storage element means for storing a program counter capability used by the processing means to determine a program counter value, the program counter capability identifying a capability state for the processing means; the processing means, responsive to the capability state indicating said default state, for operating in the capability domain; and the processing means, responsive to the capability state indicating an executive state, for operating in a manner less constrained than when in said default state so as to allow modification of the capability domain.

In a still further example configuration, there is provided a virtual machine computer program comprising program instructions to control a host data processing apparatus to provide an instruction execution environment corresponding to the apparatus of the first example configuration discussed above. In one embodiment a computer-readable storage medium may be provided for storing the virtual machine computer program.

The present technique will be described further, by way of example only, with reference to embodiments thereof as illustrated in the accompanying drawings, in which.

Figure 1:
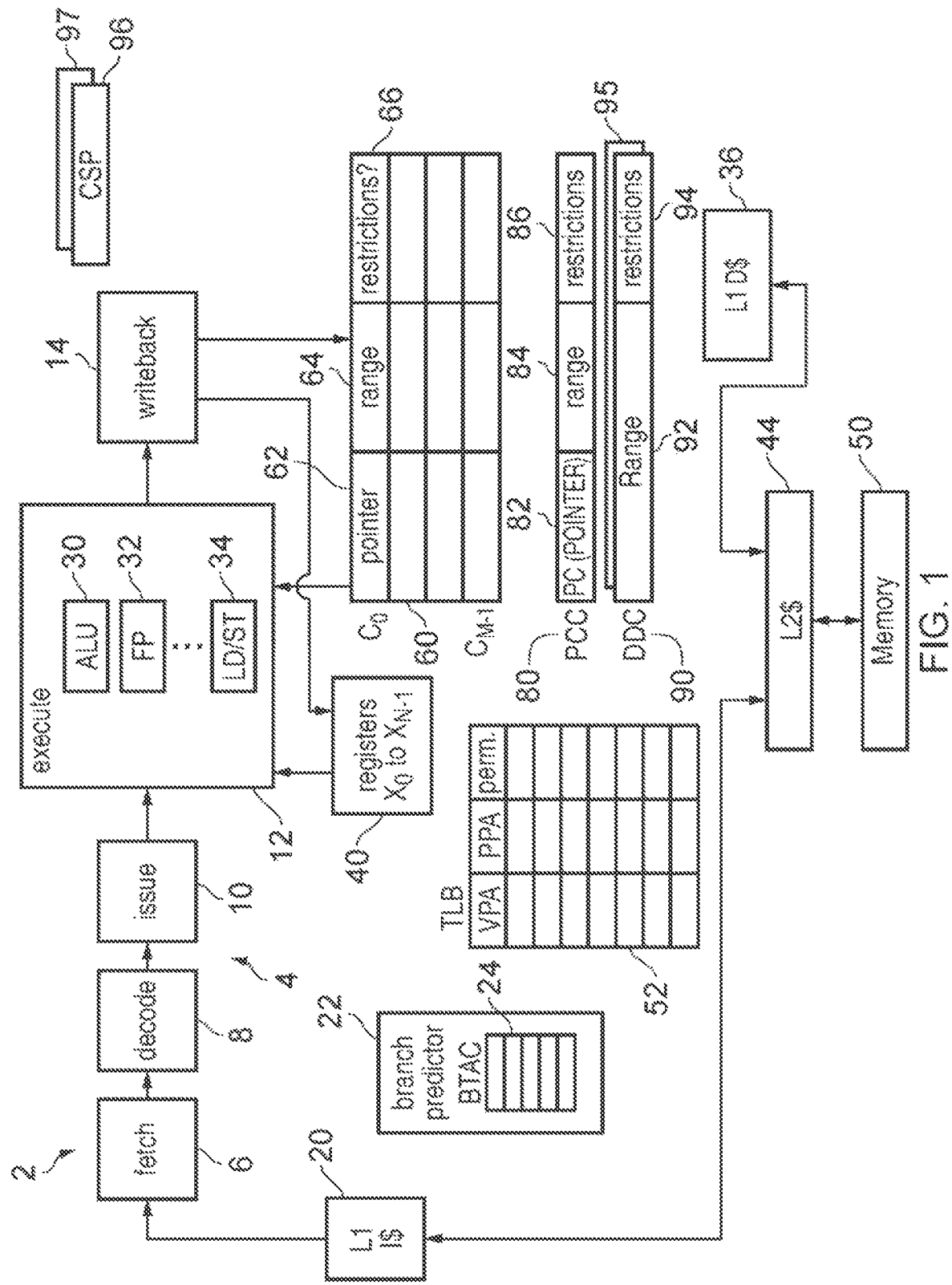
FIG. 1 is a block diagram of an apparatus in accordance with one embodiment.

Before discussing the embodiments with reference to the accompanying figures, the following description of embodiments is provided.

As mentioned earlier, there is an increasing interest in capability-based architectures in which certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information).

An apparatus adopting such a capability-based architecture will typically have storage elements (also referred to herein as bounded pointer storage elements, or more generally capability storage elements) that are used to store the capabilities. The storage elements can be registers (also referred to herein as bounded pointer registers or capability registers) and/or can be memory locations in general purpose memory, for example a location on a stack memory. Certain instructions can be used to reference such storage elements in order to access a desired capability, and perform operations dependent on that capability. For example, considering a bounded pointer, execution of such an instruction can cause the bounded pointer to be retrieved, and for the pointer value therein to then be used to derive an address in memory required during execution of the instruction. The pointer value may be used directly to identify the memory address, or may be used to derive the memory address, for example by the addition of an offset to the pointer value. The operation will then be allowed to proceed provided that the memory address is within the range specified by the range information, and any permissions specified in the permissions information are met.

Hence, when using bounded pointers, the pointer value itself may point to, or be used to determine, the address of a data value to be accessed or an instruction to be fetched for execution, for example. However the range and permission information may then be referred to, for example, to ensure that any address accessed is within an allowable range, and being accessed for an allowed purpose. This can be useful for example for ensuring that the address determined from the pointer remains within certain bounds to maintain security or functional correctness of behaviour.

By such an approach, it is possible to effectively police memory accesses made by the processing circuitry. However, as mentioned earlier, a problem that arises is how to efficiently and reliably provide a mechanism that would enable the capability domain to be changed, as this may require access to memory addresses that are not accessible given the capabilities of the current capability domain.

In accordance with one embodiment, an apparatus is provided that has processing circuitry to execute instructions, the processing circuitry when in a default state being arranged to operate in a capability domain comprising capabilities used to constrain operations performed by the processing circuitry when executing the instructions. A program counter capability storage element is also provided to store a program counter capability used by the processing circuitry to determine a program counter value. In accordance with the embodiments described herein, that program counter capability also includes information to identify a capability state for the processing circuitry.

The processing circuitry is arranged, when the capability state indicates the default state, to operate in the capability domain. As a result, the processing circuitry cannot access memory addresses that are not accessible given the capabilities of the current capability domain. However, responsive to the capability state indicating an executive state, the processing circuitry is instead arranged to operate in a manner less constrained than when in the default state, so as to allow modification of the capability domain.

There are a number of ways in which the constraints of the capability domain can be relaxed when in the executive state, but the purpose is to allow the processing circuitry to be able to access one or more memory addresses or regions that would not otherwise be accessible were the constraints of the capability domain enforced.

Hence, in accordance with the described embodiments, capabilities are supplemented so that they can additionally specify capability state information. If such a capability is then moved into the program counter capability storage element so as to form a program counter capability, the capability state information specified by that capability is then used to identify the current capability state of the processing circuitry, and hence determines whether the processing circuitry is in the default state constrained to operate in accordance with the capability domain, or in the executive state where it can operate in a manner less constrained.

This provides a simple and effective mechanism for allowing processing circuitry temporarily to be given enhanced rights sufficient to enable it to modify the capability domain. When in due course the program counter capability is updated so as to identify as the new capability state of the processing circuitry the default state, then the processing circuitry will operate in accordance with the capability domain as modified whilst the processing circuitry was in the executive state.

There are a number of mechanisms that may be used to update the program counter capability as stored within the program counter capability storage element, in order to change the capability state. In one embodiment, the processing circuitry may be arranged to execute a branch instruction identifying a capability, in order to move that identified capability into the program counter capability storage element to form a new program counter capability, whereafter the processing circuitry operates in the capability state identified by the new program counter capability. Hence, a process that is currently being performed may move one of the capabilities that it currently has access to from a general purpose capability storage element into the program counter capability storage element, through use of a branch instruction, with the processing circuitry's capability state then being identified by the new program counter capability resulting from performance of the branch operation.

The branch instruction can take a variety of forms. However, in one embodiment the branch instruction is a branch with link instruction. In such a scenario, the program counter capability stored in the program counter capability storage element prior to execution of the branch with link instruction may be considered to form an old program counter capability, and the processing circuitry is arranged to use the old program counter capability to generate a return address capability for storing in a return address capability storage element, the return address capability retaining the capability state identified by the old program counter capability. As a result, this enables the process to branch to a particular section of code, and then when that code has been executed, to return the content of the program counter capability storage element to a form which retains the capability state that existed prior to the branch being performed. Hence, by way of example, the code could branch to a particular section of code to be operated in an executive state, enabling certain changes to be made to the capabilities that will form the capability domain, and on completion of that code the process will then return back to the default state, at which point the processing circuitry will be constrained by the capabilities of the revised capability domain.

Hence, in one embodiment, the processing circuitry may be arranged to execute a return instruction (which can be considered to be another form of branch instruction) to write the return address capability into the program counter capability storage element to form a return program counter capability, whereafter the processing circuitry operates in the capability state identified by the return program counter capability.

There are a number of ways in which the processing circuitry may be arranged to operate in a less constrained manner when the capability state indicates the executive state. However, in one embodiment, the processing circuitry is arranged to operate in such a less constrained manner by arranging for the processing circuitry to be unconstrained by capabilities whilst operating in the executive state. Such an approach hence gives the processing circuitry full access to the memory address space, removing all of the safeguards of the capability domain, but may be useful in certain situations where the code executing in the executive state is highly trusted.

In an alternative embodiment, when the capability state indicates the executive state, the processing circuitry may be arranged to operate in a less constrained manner than when in the default state by disabling at least one capability check whilst the processing circuitry is operating in the executive state. The capability check disabled can take a variety of forms. For example, it is possible that certain memory access instructions may identify a non-bounded pointer stored within general purpose registers of the data processing apparatus. To ensure that those accesses are also constrained, a default data capability (DDC) may be provided providing range information and any associated permissions, and that default data capability may be referred to when determining whether to allow a memory access to proceed for an address identified with reference to a non-bounded pointer. However, in one embodiment, when in the executive state, it may be decided to turn off any such check performed with reference to the default data capability, thereby providing a mechanism for the processing circuitry to access memory address space outside of that allowed by the capability domain.

As another alternative, when the program counter capability is used to identify an address from which to fetch an instruction, it may be decided to disable the associated capability check performed with reference to the range and permission information of the program counter capability if the processing circuitry is operating in the executive state.

In a yet further alternative embodiment, the apparatus may further comprise one or more sets of banked capability storage elements to store capabilities, each set of banked capability storage elements comprising a first capability storage element to store a capability used to constrain operations performed by the processing circuitry when operating in the default state and a second capability storage element to store a capability used to constrain operations performed by the processing circuitry when operating in the executive state. The capabilities identified in the first and second capability storage elements of each set of banked capability storage elements may then be arranged such that, when the capability state indicates the executive state, the processing circuitry operates in a manner less constrained than when in said default state.

Hence, in accordance with such an embodiment, the banking of at least some of the capability storage elements can be used as a mechanism for allowing a relaxation of the constraints of the capability domain when operating in the executive state. In particular, when in the executive state, the processing circuitry in such an embodiment will refer to a different banked storage element for at least one of the capabilities used, with that banked capability storage element storing a capability that specifies less onerous constraints than the normal capability used when in the default state. This allows the processing circuitry to be given controlled additional permission rights when in the executive state, sufficient to enable the capability domain to be modified.

As an alternative to using banked capability storage elements, in an alternative embodiment, when an update to the program counter capability causes the capability state to change from a source state to a destination state, the capabilities in one or more capability storage elements pertaining to the source state are saved to allow them to be restored later, and the associated capabilities associated with the destination state are written into said one or more capability storage elements. When the capability state changes to the executive state, the capabilities written into said one or more capability storage elements can be arranged such that the processing circuitry operates in a manner less constrained than when in the default state. Hence, the contents of certain capability storage elements may be switched when the capability state changes, as indicated by the current program counter capability, to thereby allow some of the capabilities to be replaced with less restricted versions, allowing the processing circuitry to have enhanced access to memory sufficient to enable it to change the capability domain.

In one embodiment, a mechanism can be provided to constrain how the capability state may be changed from the executive state to the default state. In particular, it may be necessary to ensure that when the capability state returns to the default state, the processing circuitry is not left with any executive rights that could enable it to circumvent the capability domain. Accordingly, in one embodiment, when the branch instruction identifies a capability that will cause the capability state to change from the executive state to the default state, the processing circuitry is arranged to perform a check operation in order to determine whether use of the program counter capability as updated using the capability identified by the branch instruction is allowed.

There may be a number of ways of identifying allowed branch instructions. However, in one embodiment one or more types of branch instruction are provided that can be used to change the capability state from the executive state to the default state, and if a branch is attempted by a process other than use of the one or more specific types of branch instruction then the check operation will detect that situation and take an appropriate action.

In particular, in one embodiment, on determining a fail condition for the check operation, the processing circuitry is arranged to perform a predetermined action. The predetermined action can take a variety of forms. For example, in one embodiment it may involve taking an exception on execution of the branch instruction that caused the fail condition to be determined. The software exception handler will then transfer control to an appropriate error handling routine to deal with the attempted change from the executive state to the default state. For example, the exception handling routine may cause the program counter update to take place, but for the processing circuitry to remain within the executive state. Alternatively, it may be arranged to perform some additional checks and/or clean up operations to make sure that it is safe for the program counter capability to be updated in a way that causes the processing circuitry to return from the executive state to the default state, before allowing the update of the program counter capability in accordance with the branch instruction to take place.

As an alternative to taking the exception immediately on execution of the branch instruction, in an alternative embodiment a flag may be set to indicate the occurrence of the fail condition, but the execution of the branch instruction may be allowed to complete in order to update the program counter capability. Thereafter, the presence of the set flag can be used to cause an exception to be taken when a next instruction is to be executed. This allows certain events to happen in between the time the branch instruction is executed and the flag is set, and the time the exception is taken. For example, it can allow a higher priority exception/interrupt to be taken that preserves the flag information and the program counter capability (PCC) information, and then clears the flag and loads a different program counter capability into the program counter capability storage element. On return from that higher priority exception/interrupt, the flag and PCC information will then be restored, and when the next instruction is to be executed the presence of the set flag will cause the exception to be taken.

In one embodiment, the capability state information maintained within the program counter capability may be treated like any other permission information held within the capability, and as such it may be possible to clear the information indicative of the capability state, so as to change the capability state to the default state. This would for example allow the processing circuitry whilst operating in the executive state, to itself transition to the default state through clearing of the relevant information field within the program counter capability. However, in accordance with the general principle that the process whose activities are managed by a specified capability is not allowed to increase the permissions of the specified capability, it would not be possible for the processing circuitry to change the value of the capability state information in a way that indicated a transition from the default state to the executive state.

In an alternative embodiment, the capability state information may be treated as a new type of field separate to the general permissions fields, and may be arranged so that it cannot be changed by the process that is using that capability.

Particular embodiments will now be described with reference to the Figures.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
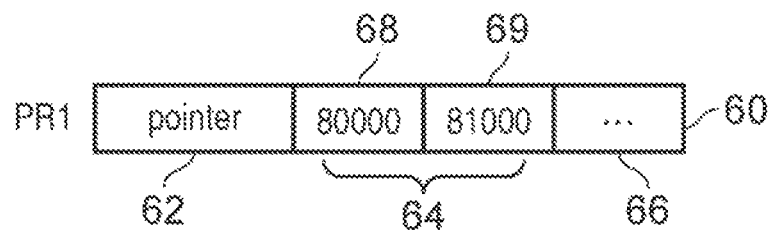
FIG. 2 shows examples of types of instruction for which an error may be triggered if there is an attempt to set or access a pointer value within a set of bounded pointer storage elements where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception levels of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Further, in one embodiment non-bounded pointers may also be specified within the general purpose registers 40 and used when performing memory accesses. To limit memory addresses that may be accessed using such non-bounded pointers, a Default Data Capability (DDC) register 90 may be provided that specifies both range information 92 and any restriction data 94, similar to the range and restriction information included within any of the capability registers. Then, when a memory access instruction is executed that identifies a memory address with reference to a non-bounded pointer in a general purpose register 40, a bound check operation similar to the bound check operation performed in respect of bounded pointers can still be performed based on any address derived from that non-bounded pointer, but in this instance having regards to the range and restriction information held within the DDC register 90. By such an approach, it is possible for example for capability aware code that wishes to utilise some capability unaware code in an existing software library to set the DDC register 90 so as to place constraints on how pointers accessed from the general purpose register 40 are used when executing that capability unaware code. In particular, the range information can be used to limit the address range that can be accessed when executing such capability unaware code.

The range information and any associated restrictions specified in the PCC register 80 or the DDC register 90 can be set in a variety of ways. However, in one embodiment that information is determined using one or more of the bounded pointers available to the processing circuitry in a current capability domain, so that no memory address can be accessed using PCC or DDC based bound checks that resides outside the memory address range(s) identified for the current capability domain.

Figure 3:
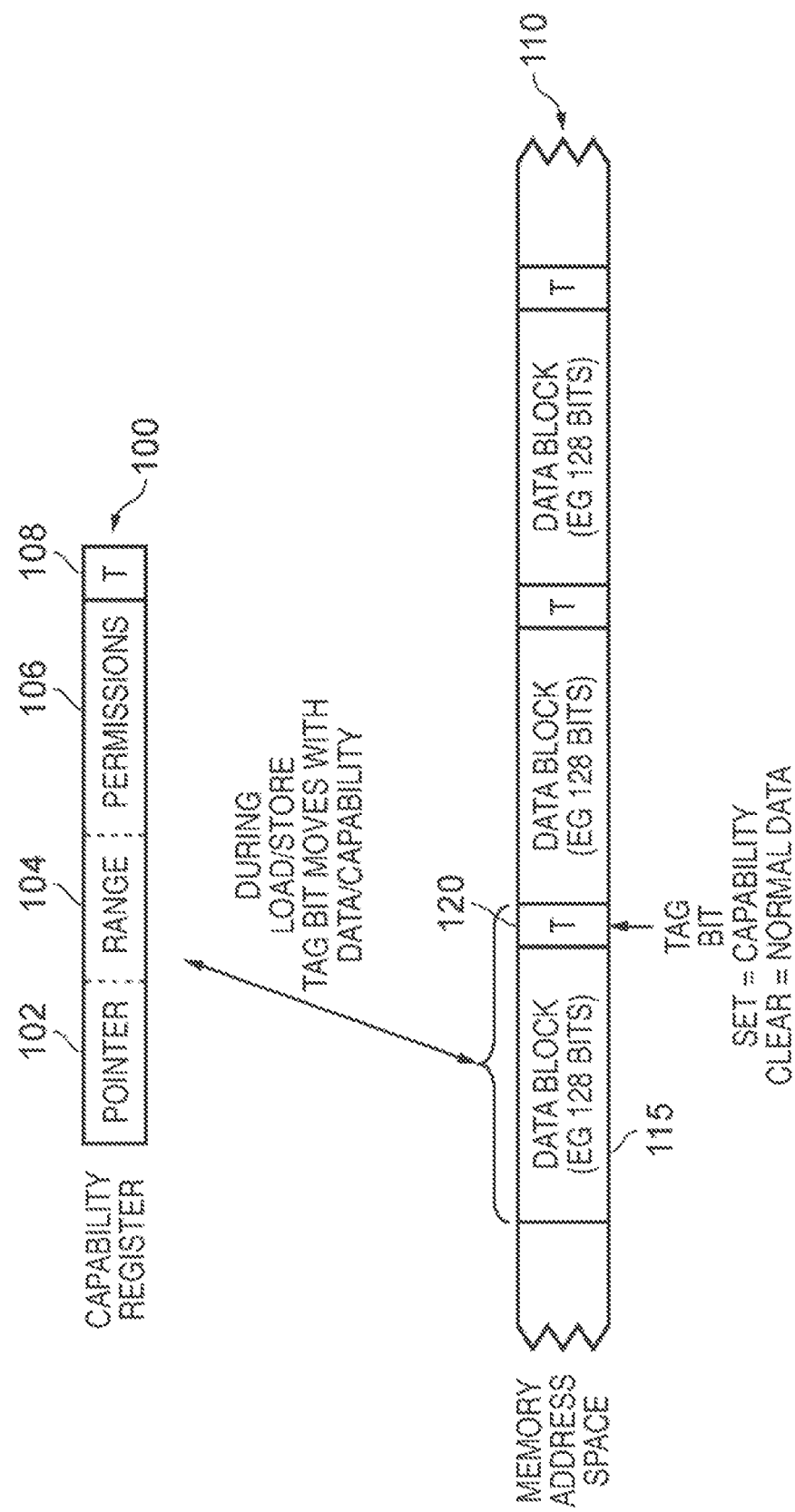
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

As mentioned earlier, the current set of capabilities available to the processing circuitry (whether directly accessible via the capability registers 60, or residing within a memory address space accessible via one of the bounded pointers in the capability registers) form a capability domain. Hence the capability domain identifies the available regions of memory that may be accessed by the processor, along with any associated permissions/restrictions. As will be discussed with reference to the remaining figures, in the described embodiments a controlled mechanism is provided to enable the apparatus to alter the capability domain.

In particular, in one embodiment a bounded pointer is provided with an additional field in addition to the pointer value field 62, range field 64 and permissions/restrictions field(s) 66 discussed earlier. In particular, a capability state field is provided that can be set or cleared to identify the executive state or the default state discussed earlier. Whilst the capabilities reside within any of the general purpose capability register 60 discussed earlier with reference to FIG. 1, this capability state information is not used. However, when such a bounded pointer is loaded into the PCC register 80, this additional field is referred to in order to identify the current capability state of the processor.

Figure 4:
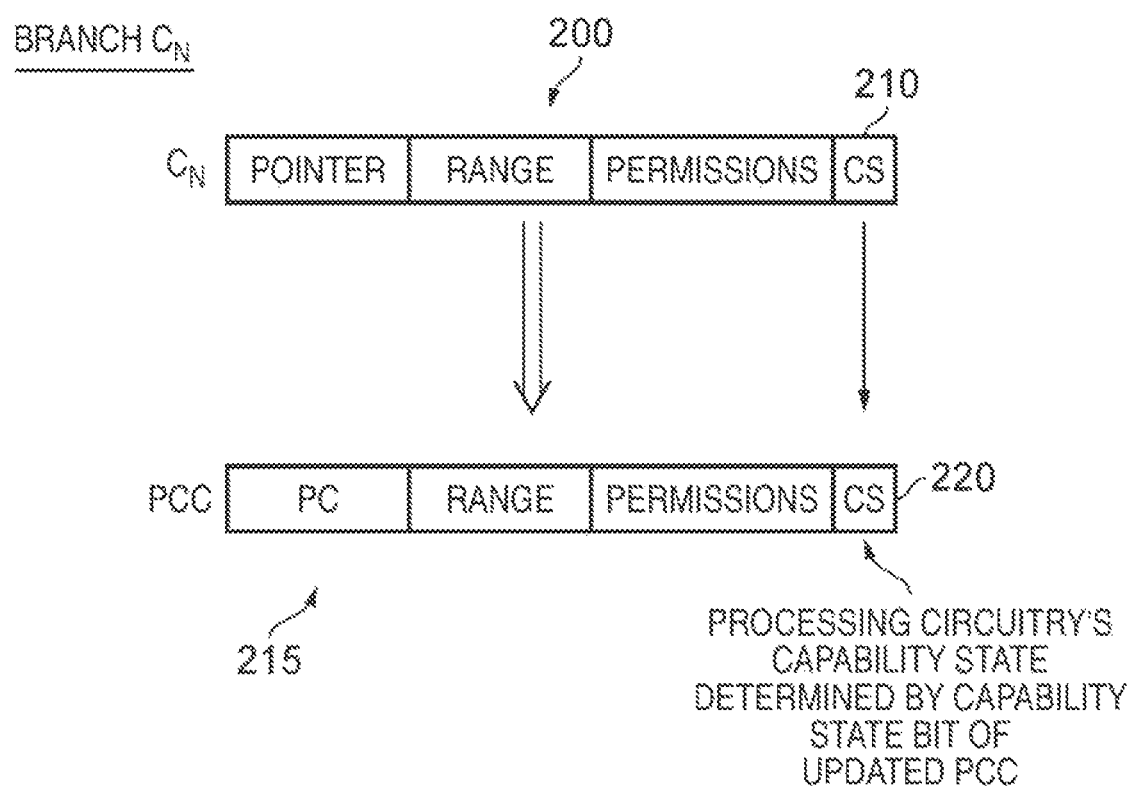
FIG. 4 illustrates the operations performed when executing a branch instruction in accordance with one embodiment, in order to update the capability state of the processing circuitry.

This is illustrated by way of example with reference to FIG. 4, which schematically illustrates the operation of a branch instruction specifying as an operand the capability register $C_N$. The capability 200 stored within the capability register $C_N$ includes a capability state field 210. Whilst the capability is stored within the capability register, the information in the field 210 is not used. However, when the branch instruction is executed to load into the program counter capability register 80 the capability stored within the capability register $C_N$, then the resultant updated contents 215 of the PCC register 80 now contain the capability state 220, which has the same value as provided within the capability 200. As also illustrated schematically, the range and permissions information is copied across from the capability register $C_N$ into the PCC and the pointer value in the capability $C_N$ forms the new PC value. Once the PCC storage element 80 has been updated, the processing circuitry's capability state is determined by the capability state bit of the updated PCC 215.

In one embodiment, the capability state field can be considered to be an additional permissions field, and can be manipulated in the same way as other permissions. In particular, a process running on the processor may be able to remove one or more permissions of a capability that it is using, typically by clearing one or more permission bits, and in one embodiment would be allowed to perform the same process with regards to the capability state field. Accordingly, this would allow a capability state field that indicated an executive state to be cleared to indicate the default state. However, consistent with general practice with regards to capabilities, the process would not be allowed to increase its permissions, and would hence not be allowed to set the capability state field if that capability state field is clear, hence preventing the process associating the executive state with a capability state field of a capability whose current value indicates the default state.

In an alternative embodiment, the capability state field 210 may be considered to be a new type of field separate to the permissions field, and may be arranged so that it cannot be modified by a process using that capability.

Figure 5:
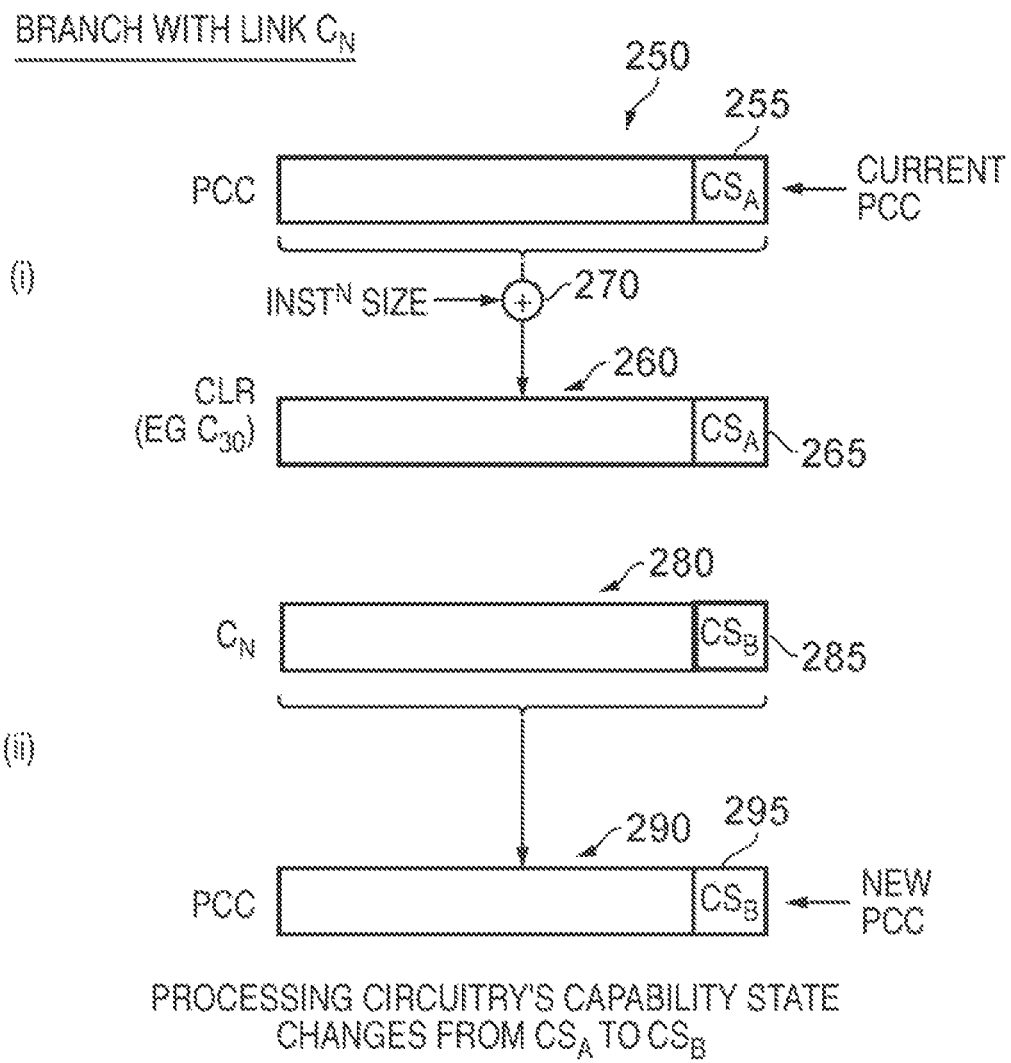
FIG. 5 illustrates the operations performed when executing a branch with link instruction in accordance with one embodiment, in order to update the capability state of the processing circuitry.

FIG. 5 is a diagram similar to FIG. 4, but showing the operations that take place when performing a branch with link instruction, again specifying the capability register $C_N$. In particular, two separate processes are performed when executing the branch with link instruction. As shown by step i, a return address is created from the current PCC contents which is then stored in a capability link register (CLR) as a return address capability for use later when returning from the branch. As shown, the current PCC capability 250 is read from the PCC register, and used to create a return address capability 260 stored in the CLR. The CLR can take a variety of forms, but in one embodiment is a dedicated one of the general purpose capability registers, for example $C_{30}$. As part of this process, the capability state 255 within the current PCC capability 250 will be copied across to form the field 265 within the return address capability 260, thus ensuring that when in due course the process returns from the branch, the capability state will be restored to the state that existed prior to the branch being taken.

Further, in one embodiment the current range and permissions information is also copied across from the PCC into the return address capability, and the current PC value is incremented by the instruction size, as indicated by the function 270, in order to generate a return address within the return address capability.

As shown by step ii, the capability within the specified source register $C_N$ is then copied into the PCC storage element 80, as a result of which the capability state 285 within the capability 280 is copied into the capability state field 295 of the PCC when the new program counter capability 290 is created. As a result, the processing circuitry's capability state changes from $CS_A$ to $CS_B$.

Figure 6:
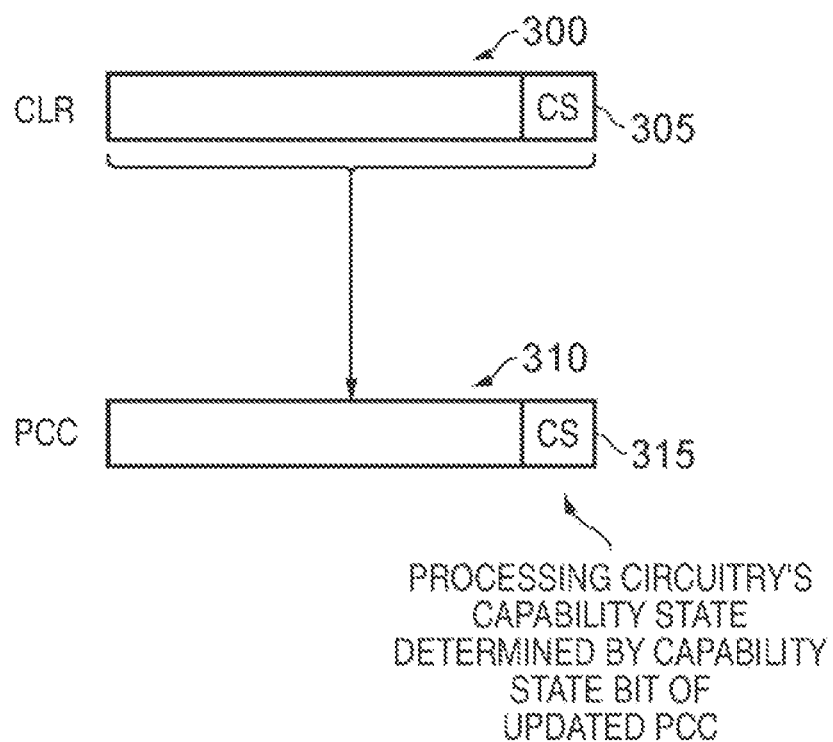
FIG. 6 illustrates the operations performed when executing a return instruction in accordance with one embodiment, in order to update the capability state of the processing circuitry.

FIG. 6 illustrates the process performed when executing a return instruction. On execution of the return instruction, the current contents of the CLR are copied into the PCC storage element 80. As a result, the return address capability 300, including its capability state 305, is copied into the PCC storage element to form the new program counter capability 310, with associated capability state field 315 whose value matches the value in the capability state field 305 of the CLR. As a result, the processing circuitry's capability state is determined by the capability state of the updated PCC, which will then be the same capability state that was present prior to the original branch with link instruction having been executed.

Through the above described mechanisms, it is possible for the program counter capability to be updated at certain points so that it specifies as the capability state the executive state. When in the executive state, the processing circuitry is able to operate in a manner less constrained than when in the default state, so as to allow modification of the capability domain. This relaxation in constraints can be implemented in a variety of ways. For example, in one embodiment it may be arranged that the processor is unconstrained by capabilities whilst operating in the executive state. As a result, whenever a capability is referred to, any associated range and restriction information may be ignored, thereby allowing the processor to access regions of memory outside of that associated with the capability domain that would be in place whilst in the default state. This allows, for example, additional capabilities to be accessed which can then be made available to the processor when returning to the default state, thereby resulting in a modified capability domain.

In some embodiments, it may be considered inappropriate to completely remove reference to capabilities whilst operating in the executive state, and instead it may be arranged that one or more of the capability checks are disabled whilst he processing circuitry is operating in the executive state, but the other capability checks are still performed. For example, it may be decided that when in the executive state, no capability checks are used when fetching instructions from memory using the program counter capability, and hence the range 84 and restrictions 86 information associated with the PCC 80 are ignored.

As an alternative, or in addition, the DDC 90 may be ignored, so that when the processor accesses memory with reference to non-bounded pointers no capability checks are performed. However, it may still be the case that where memory is accessed using bounded pointers in the capability registers 60, the associated range and permissions information is checked before allowing the access to proceed.

As another alternative, and as schematically illustrated in FIG. 1, certain of the capability registers may be banked, so that there is a version of the capability register used when the processor is operating in the default state, and a different version that is used when the processor is operating in the executive state. For example, as shown in FIG. 1, the DDC register may be banked, so that there is one DDC register 90 used when the processor is in the default state, and a different DDC register 95 used when the processor is in the executive state. This allows the default data capability used when in the default state to differ from the default data capability used when in the executive state. In particular, the default data capability used in the executive state may be arranged to extend the range of addresses accessible, and/or increase the permissions relative to the default data capability used when in the default state. As another example, a capability stack pointer (CSP) may be identified and stored within an associated register 96 used in the default state. However, a banked version 97 may be provided, which is instead referred to for the capability stack pointer when operating in the executive state. Accordingly, the processor may have different capabilities associated with its stack pointer, dependent on whether it is operating in the default state or the executive state, with the processor switching between the different banked registers dependent on the current capability state.

Whilst the banking of capability registers has been illustrated by way of example with reference to the DDC registers and the CSP registers, it will be appreciated that in alternative embodiments additional, or different, capability registers can be banked if desired.

As an alternative to banking certain capability registers, it may be instead arranged that the equivalent capability available in the executive state is set to some default capability, for example a maximum capability. Hence, considering the DDC example, the DDC register 90 may be used whilst in the default state, but when in the executive state a predetermined DDC may be effectively hard coded for use by the processor.

As another alternative to using banked capability registers, save and restore type functions can be performed when the capability state changes, as indicated by the capability state information in the PCC. In particular, when the capability state changes from a source state to a destination state, the capabilities in one or more capability storage elements pertaining to the source state may be saved to certain control registers, to allow them to later be restored, and, once saved, the associated capabilities associated with the destination state are then written into the relevant capability storage elements. Again, such a process can enable the capability constraints to be relaxed when the processor is operating in the executive state, by providing more generous permissions and/or range access to the processor when performing certain functions.

Figure 7:
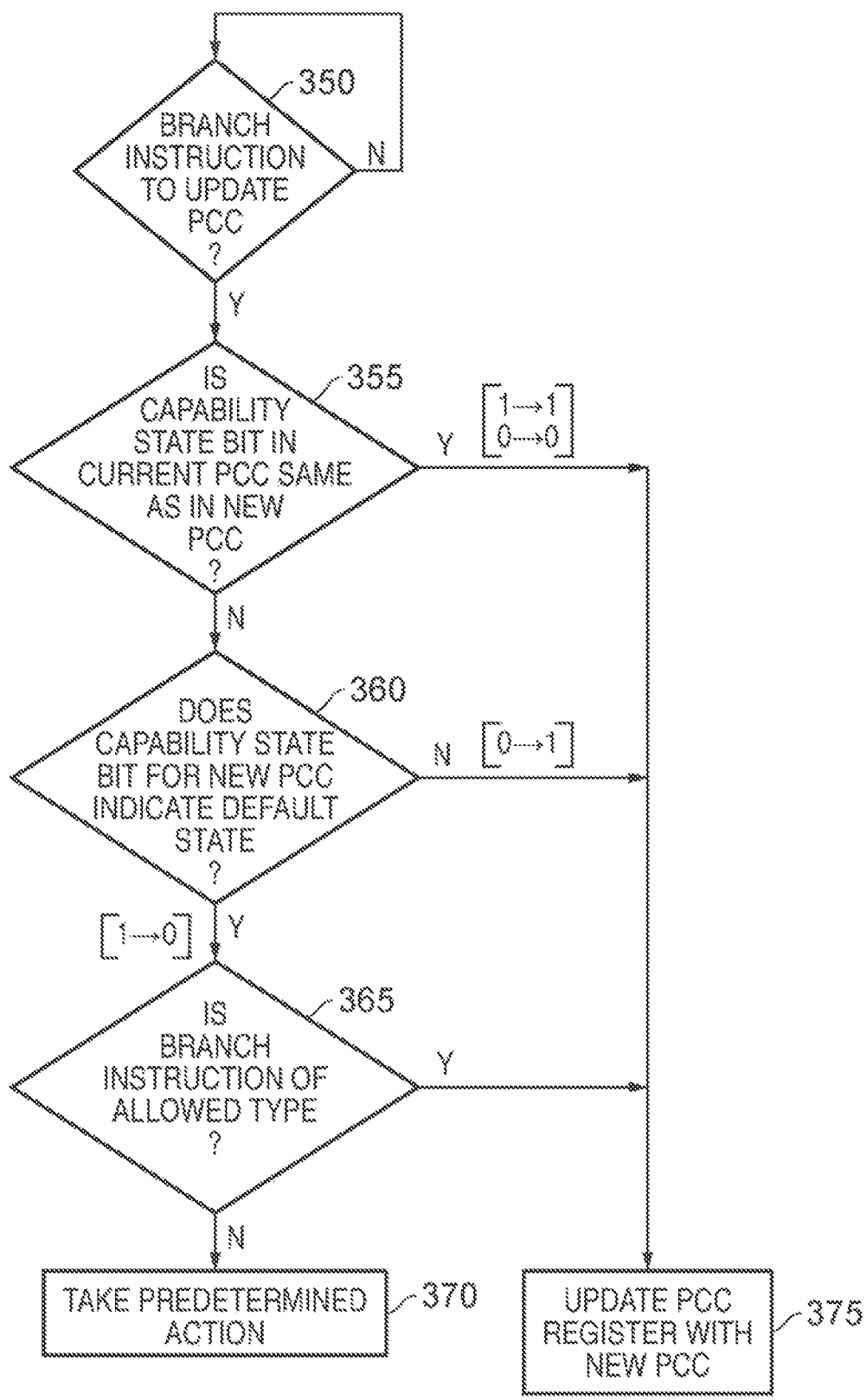
FIG. 7 is a flow diagram illustrating steps undertaken in accordance with one embodiment when updating the program counter capability.

For the purposes of the following discussion of FIGS. 7 and 8, all of the previously described examples of FIGS. 4, 5 and 6 will generically be referred to as branch instructions, as they cause the contents of the PCC storage element 80 to be updated to identify a new program counter capability. As discussed with reference to FIG. 7, certain checks can in one embodiment be performed when any such branch instruction is encountered. In particular, once a branch instruction is identified at step 350 that is being used to update the PCC, it is then determined at step 355 whether the capability state bit in the current PCC is the same as in the new PCC that will overwrite the current contents. If so, then the process proceeds to step 375, where the PCC register 80 is updated with the new PCC.

However, if at step 355 it is determined that the capability state bits are different, then at step 360 it is determined whether the capability state bit for the new PCC indicates the default state. If it does not, then this indicates that the update will cause the processor to move from the default state to the executive state, and in one embodiment this is an allowed transition without the need for any additional checks. Accordingly, the process proceeds to step 375 where the PCC contents are updated.

However, if the capability bit for the new PCC does indicate the default state, then this indicates a transition from executive state to default state, and in one embodiment this is only allowed if certain types of branch instruction are used to perform that transition. Accordingly, at step 365, it is determined whether the branch instruction is of the allowed type. In one particular embodiment, the three allowed types of branch instruction are a branch to restricted (BRR) instruction, a branch with link register to restricted (BLRR) instruction and a return to restricted (RETR) instruction. If the branch instruction is one of these allowed types, then the process proceeds to step 375, whereas otherwise the process proceeds to step 370 where a predetermined action is taken.

Figure 8A:
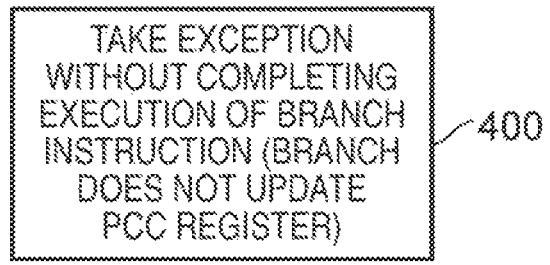
FIGS. 8A and 8B illustrate two alternative options for performing step 370 of FIG. 7 in accordance with one embodiment.
Figure 8B:
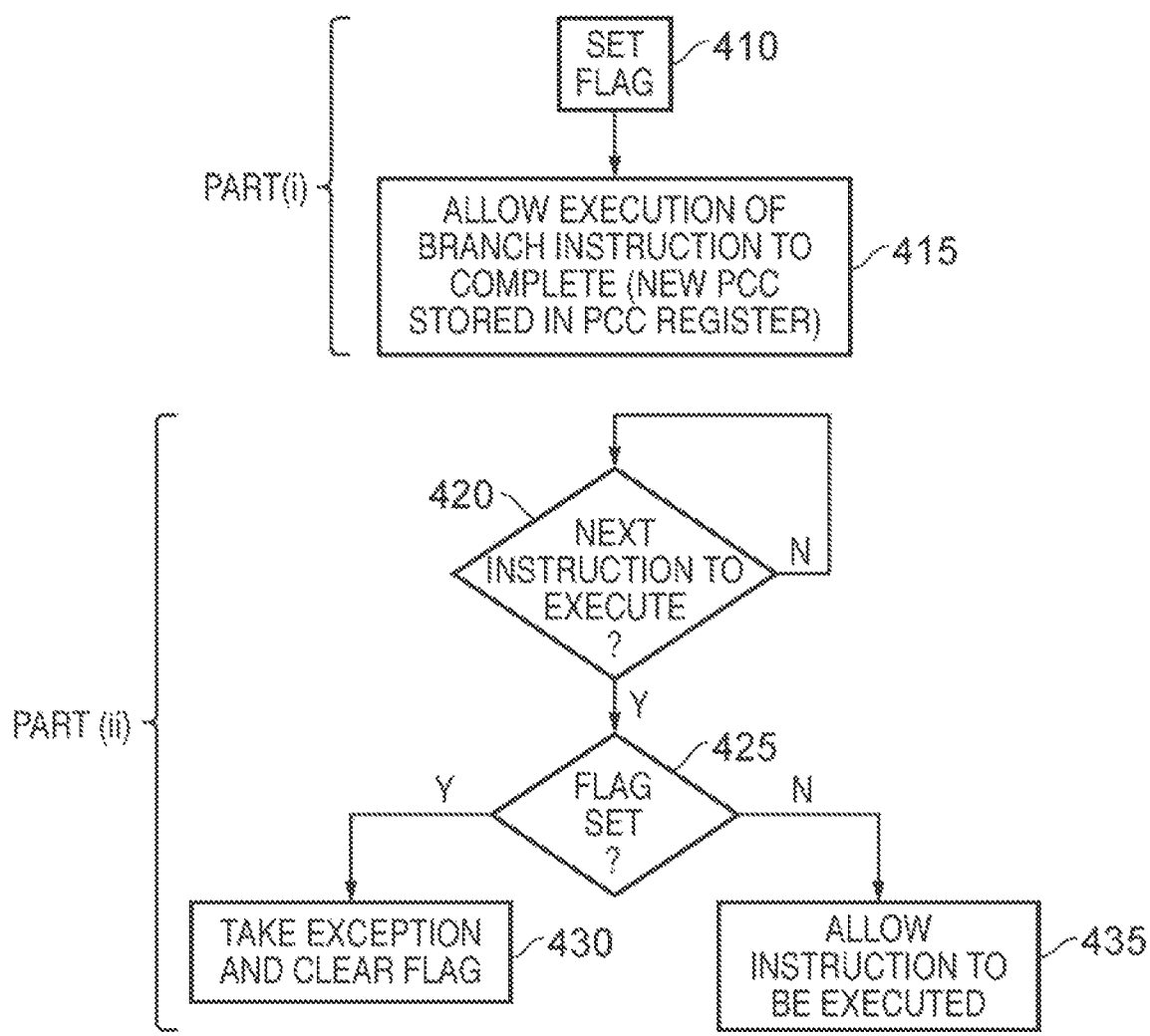

The predetermined action can take a variety of forms, and two example options are illustrated in FIGS. 8A and 8B. As shown in FIG. 8A, one option is to take an exception at step 400 without completing execution of the branch instruction, as a result of which the branch does not update the PCC register contents. Instead, the software exception handler will transfer control to an appropriate error handling routine that is executed to resolve the situation. There are a number of ways in which the exception handling routine can resolve the situation. For example, in one embodiment it may allow the PCC contents to be updated, but the capability state bit to be forced to continue to identify the executive state. Alternatively, it can perform certain additional steps to ensure that the processor will be not left with any executive privilege once it returns to the restricted state, and hence it can be ensured that once the processor returns to the restricted state, it will be fully constrained by the modified capability domain.

As an alternative to the process shown in FIG. 8A, the process shown in FIG. 8B can instead be performed, which effectively has two discrete parts. Firstly, at step 410, a flag is set in a control register to identify that a branch instruction not of the allowed type has sought to update the PCC in a way that transitions the processor from the executive state to the default state. Thereafter, at step 415, execution of the branch instruction is allowed to complete, resulting in the new PCC being stored in the PCC register 80, and identifying the default state.

As shown by part ii of FIG. 8B, it is then determined when the next instruction is to execute at step 420, and as soon as it is determined that the next instruction is to execute, then it is determined if the flag is still set at step 425, and if so an exception is taken at step 430, at which point the flag is cleared. An exception handling routine is then triggered, which can perform the processes discussed earlier with reference to FIG. 8A. If it is determined at step 425 that the flag is not set, then the instruction is allowed to be executed at step 435.

As a result of the process shown in FIG. 8B, it is possible for certain events to happen after the flag has been set and the branch instruction has completed, before an exception is triggered. For example, a higher priority exception/interrupt may occur that preserves the flag status and the PCC contents, and then clears the flag and loads a different value into the PCC. A higher priority exception routine can then be executed to perform required functionality, and on return from that exception the previous PCC contents will be restored into the PCC register and the flag will be restored to the set state. At that point, as soon as the next instruction is identified at step 420, it will be determined that the flag is set, and an exception will be taken at step 430 to deal with the flag set condition.

Figure 9:
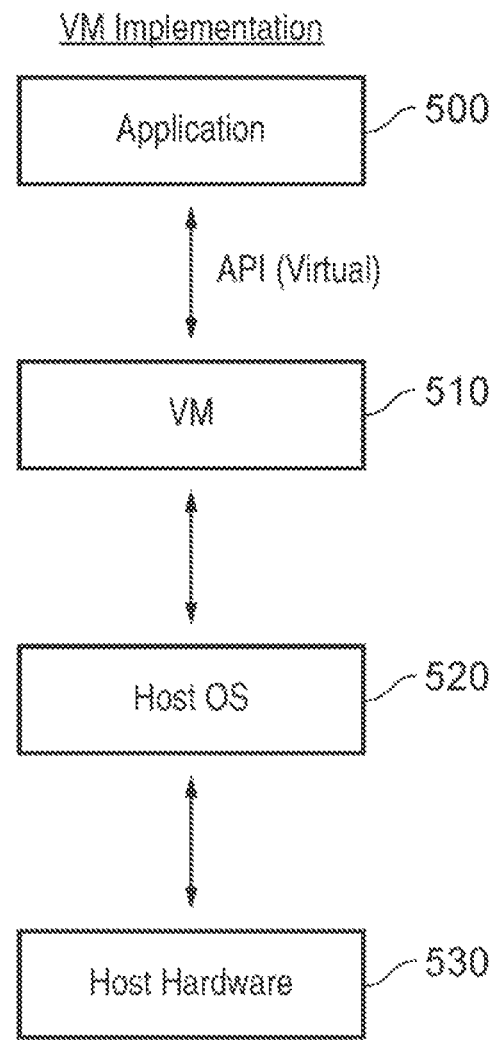
FIG. 9 illustrates a virtual machine implementation that may be used.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510. The above described techniques for managing the capability domain may be implemented within a virtual machine environment. For example, software running in, or controlling, a virtual machine, could make use of hardware implementing such a feature.

From the above described embodiments, it will be seen that these described embodiments provide two levels of privilege that are orthogonal to that that may be provided by multiple exception levels, where each exception level has different software execution privilege. In particular, within an exception level, the processor can be placed in either a default state or an executive state, and when in an executive state the processing circuitry can operate in a manner less constrained than when in the default state, in the default state the processor being constrained by the current capability domain. This provides a mechanism to allow the capability domain to be altered if desired.

In accordance with the described techniques, the current capability state is encoded within information provided within the program counter capability, and hence a branching mechanism can be used to install a new capability into the program counter capability register, to thereby potentially change the capability state. This provides a simple and effective mechanism for allowing the processing circuitry to selectively be given the ability to make changes to the capability domain.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions, the processing circuitry when in a default state being arranged to operate in a capability domain comprising capabilities used to constrain operations performed by the processing circuitry when executing said instructions; and
a program counter capability storage element to store a program counter capability used by the processing circuitry to determine a program counter value, the program counter capability being provided with a capability state field separate to a program counter field storing a program counter value, the capability state field having a value identifying a capability state for the processing circuitry;
the processing circuitry being arranged, responsive to the capability state indicating said default state, to operate in the capability domain, wherein when the processing circuitry is operating in said default state, the capability domain cannot be modified by the processing circuitry; and
the processing circuitry being arranged, responsive to the capability state indicating an executive state, to operate in a manner less constrained than when in said default state so as to allow modification of the capability domain,
wherein the capabilities each identify an allowable range of memory addresses.

2. An apparatus as claimed in claim 1, wherein the processing circuitry is arranged to execute a branch instruction identifying a capability, in order to move that identified capability into the program counter capability storage element to form a new program counter capability, whereafter the processing circuitry operates in the capability state identified by the new program counter capability.

3. An apparatus as claimed in claim 2, wherein:
the branch instruction is a branch with link instruction;
the program counter capability stored in the program counter capability storage element prior to execution of the branch with link instruction forms an old program counter capability; and
the processing circuitry is arranged to use the old program counter capability to generate a return address capability for storing in a return address capability storage element, the return address capability retaining the capability state identified by the old program counter capability.

4. An apparatus as claimed in claim 3, wherein the processing circuitry is arranged to execute a return instruction to write the return address capability into the program counter capability storage element to form a return program counter capability, whereafter the processing circuitry operates in the capability state identified by the return program counter capability.

5. An apparatus as claimed in claim 1, wherein the processing circuitry is arranged, when the capability state indicates the executive state, to operate in a manner less constrained than when in said default state by arranging for the processing circuitry to be unconstrained by capabilities whilst operating in the executive state.

6. An apparatus as claimed in claim 1, wherein the processing circuitry is arranged, when the capability state indicates the executive state, to operate in a manner less constrained than when in said default state by disabling at least one capability check whilst the processing circuitry is operating in the executive state.

7. An apparatus as claimed in claim 6, wherein said at least one capability check that is disabled comprises at least one of:
a capability check performed with reference to a program counter capability when a program counter value is used to identify an address of an instruction to be fetched from memory; and
a capability check performed with reference to a default data capability when a non-bounded pointer is used to identify an address of a data block to be accessed in memory.

8. An apparatus as claimed in claim 1, further comprising:
one or more sets of banked capability storage elements to store capabilities, each set of banked capability storage elements comprising a first capability storage element to store a capability used to constrain operations performed by the processing circuitry when operating in the default state and a second capability storage element to store a capability used to constrain operations performed by the processing circuitry when operating in the executive state;

wherein the capabilities identified in the first and second capability storage elements of each set of banked capability storage elements are such that, when the capability state indicates the executive state, the processing circuitry operates in a manner less constrained than when in said default state.

9. An apparatus as claimed in claim 1, further comprising:
one or more capability storage elements to store capabilities used to constrain operations performed by the processing circuitry;
when an update to the program counter capability causes the capability state to change from a source state to a destination state, the capabilities in said one or more capability storage elements pertaining to said source state are saved to allow them to be restored later, and the associated capabilities associated with the destination state are written into said one or more capability storage elements;
wherein when the capability state changes to the executive state, the capabilities written into said one or more capability storage elements are such that the processing circuitry operates in a manner less constrained than when in said default state.

10. An apparatus as claimed in claim 2, wherein:
when the branch instruction identifies a capability that will cause the capability state to change from the executive state to the default state, the processing circuitry is arranged to perform a check operation in order to determine whether use of the program counter capability as updated using the capability identified by the branch instruction is allowed.

11. An apparatus as claimed in claim 10, wherein said check operation comprises determining whether the branch instruction is a type of branch instruction allowed to update the capability stored in the program counter capability storage element in a way that will cause the capability state to change from said executive state to said default state.

12. An apparatus as claimed in claim 10, wherein on determining a fail condition for the check operation, the processing circuitry is arranged to perform a predetermined action.

13. An apparatus as claimed in claim 12, wherein the predetermined action comprises one of:
taking an exception on execution of the branch instruction;
setting a flag and allowing the execution of the branch instruction to update the program counter capability, setting of the flag causing an exception to be taken when a next instruction is to be executed.

14. An apparatus as claimed in claim 1, wherein, when operating in the executive state, the processing circuitry is allowed to modify the program counter capability stored in the program counter capability storage element to change the capability state to the default state.

15. An apparatus as claimed in claim 1, wherein one or more of said capabilities comprise bounded pointers.

16. A method of managing a capability domain within an apparatus having processing circuitry to execute instructions, the processing circuitry when in a default state being arranged to operate in the capability domain, the capability domain comprising capabilities used to constrain operations performed by the processing circuitry when executing said instructions, comprising:
storing, within a program counter capability storage element, a program counter capability used by the processing circuitry to determine a program counter value, the program counter capability being provided with a capability state field separate to a program counter field storing a program counter value, the capability state field having a value identifying a capability state for the processing circuitry;
responsive to the capability state indicating said default state, operating the processing circuitry in the capability domain, wherein when in said default state, the capability domain cannot be modified by the processing circuitry; and
responsive to the capability state indicating an executive state, operating the processing circuitry in a manner less constrained than when in said default state so as to allow modification of the capability domain,
wherein the capabilities each identify an allowable range of memory addresses.

17. An apparatus comprising:
processing means for executing instructions, the processing means, when in a default state, for operating in a capability domain comprising capabilities used to constrain operations performed by the processing means when executing said instructions; and
means for storing a program counter capability used by the processing means to determine a program counter value, the program counter capability being provided with a capability state field separate to a program counter field storing a program counter value, the capability state field having a value identifying a capability state for the processing means;
the processing means, responsive to the capability state indicating said default state, for operating in the capability domain, wherein when the processing means is operating in said default state, the capability domain cannot be modified by the processing means; and
the processing means, responsive to the capability state indicating an executive state, for operating in a manner less constrained than when in said default state so as to allow modification of the capability domain,
wherein the capabilities each identify an allowable range of memory addresses.

18. A non-transitory computer-readable storage medium storing a virtual machine computer program comprising program instructions to control a host data processing apparatus to provide an instruction execution environment corresponding to the apparatus according to claim 1.

19. An apparatus as claimed in claim 1, wherein the processing circuitry is arranged, responsive to the capability state indicating an executive state, to operate in a manner less constrained than when in said default state so as to allow modification of the capability domain in order to modify how operations performed by the processing circuitry are constrained when the processing circuitry subsequently returns to operating in the default state.

* * * * *